United States Patent
Prudhomme-Lacroix (10) Patent No.: US 9,085,356 B2
(45) Date of Patent: Jul. 21, 2015

(54) METHOD AND A ROTARY WING AIRCRAFT OPTIMIZED FOR MINIMIZING THE CONSEQUENCES OF A RUNNING OFF-SPECIFICATION EMERGENCY LANDING

(71) Applicant: AIRBUS HELICOPTERS, Marignane, Cedex (FR)

(72) Inventor: Pierre Prudhomme-Lacroix, Vitrolles (FR)

(73) Assignee: Airbus Helicopters, Marignane Cedex (FR)

( * ) Notice: Subject to any disclaimer, the term of this patent is extended or adjusted under 35 U.S.C. 154(b) by 239 days.

(21) Appl. No.: 13/706,423

(22) Filed: Dec. 6, 2012

(65) Prior Publication Data

US 2013/0146706 A1 Jun. 13, 2013

(30) Foreign Application Priority Data

Dec. 21, 2011 (FR) ...................................... 11 03796

(51) Int. Cl.
*B64C 25/02* (2006.01)
*B64C 25/58* (2006.01)
*B64C 25/52* (2006.01)
(Continued)

(52) U.S. Cl.
CPC ............... *B64C 25/10* (2013.01); *B64C 25/02* (2013.01); *B64C 25/52* (2013.01); *B64C 2025/325* (2013.01)

(58) Field of Classification Search
CPC ...... B64C 25/52; B64C 27/006; B64C 25/60; B64C 2025/005; B64C 1/062; B64C 25/10; B64C 25/12; B64C 25/02; B64C 25/30; B64C 3/56

USPC ........................................ 244/104, 108, 17.17
See application file for complete search history.

(56) References Cited

U.S. PATENT DOCUMENTS 3,538,783 A 11/1970 Butts
4,537,374 A * 8/1985 Barnoin et al. ........... 244/102 R
(Continued)

FOREIGN PATENT DOCUMENTS

EP 0072323 A1 2/1983
EP 0113616 A1 7/1984
(Continued)

OTHER PUBLICATIONS

Search Report and Written Opinion; Application No. FR 1103796; dated Jun. 27, 2012.

*Primary Examiner* — Brian M O'Hara
*Assistant Examiner* — George Andonyan
(74) *Attorney, Agent, or Firm* — Brooks Kushman P.C.

(57) ABSTRACT

A method of minimizing the consequences of an off-specification landing for the occupants of an aircraft (1) having a rotary wing (10) and a fuselage (7) extending along a longitudinal anteroposterior plane of symmetry (4) between a first side (5) and a second side (6) of said aircraft (1), said aircraft having landing gear provided with at least first contact means (21) connected by a first fastener device (30) to the fuselage and at least second contact means (22) connected by a second fastener device (50) to the fuselage, the first contact means and the first fastener device being arranged on said first side (5), the second contact means and the second fastener device being arranged on said second side (6). The fastener elements of said first and second fastener devices (30, 50) are then dimensioned differently.

16 Claims, 2 Drawing Sheets

(51) Int. Cl.
  *B64C 25/10*   (2006.01)
  *B64C 25/32*   (2006.01)

(56) References Cited

U.S. PATENT DOCUMENTS

| | | | | |
|---|---|---|---|---|
| 4,558,837 A | * | 12/1985 | Mens et al. | 244/108 |
| 4,645,143 A | | 2/1987 | Coffy | |
| 5,609,312 A | * | 3/1997 | Arlton et al. | 244/17.11 |
| 6,244,538 B1 | * | 6/2001 | Howard et al. | 244/17.17 |
| 8,763,997 B2 | * | 7/2014 | Dunn | 267/217 |
| 2007/0181744 A1 | * | 8/2007 | Bietenhader | 244/108 |
| 2010/0237190 A1 | * | 9/2010 | Mouille | 244/108 |
| 2012/0006934 A1 | * | 1/2012 | Prud'Homme-Lacroix et al. | 244/17.27 |
| 2012/0080560 A1 | * | 4/2012 | Piccone et al. | 244/108 |

FOREIGN PATENT DOCUMENTS

| | | |
|---|---|---|
| FR | 1549884 A | 12/1968 |
| FR | 2010302 A6 | 2/1970 |
| FR | 2537542 A1 | 6/1984 |
| FR | 2554210 A1 | 5/1985 |
| JP | 2009073209 A | 4/2009 |

* cited by examiner

METHOD AND A ROTARY WING AIRCRAFT OPTIMIZED FOR MINIMIZING THE CONSEQUENCES OF A RUNNING OFF-SPECIFICATION EMERGENCY LANDING

CROSS REFERENCE TO RELATED APPLICATIONS

This application claims priority to French patent application No. FR 11 03796 filed on Dec. 12, 2011, the disclosure of which is incorporated in its entirety by reference herein.

BACKGROUND OF THE INVENTION (1) Field of the Invention

The present invention relates to a method and to a rotary wing aircraft optimized to minimize the consequences for the occupants of said aircraft during a running off-specification emergency landing.

(2) Description of Related Art

Such an aircraft has a rotary wing provided with at least one rotor providing at least part of the lift of the aircraft, and possibly also providing the aircraft with propulsion when the aircraft is a helicopter.

The aircraft can then land vertically while its speed of advance is zero, or it can perform a so-called "running" landing in which it lands with a positive speed of advance.

A rotary wing rotor has a plurality of blades. The person skilled in the art uses the term "advancing" blade to designate each blade that is moving forwards relative to the movement in translation of the aircraft, and uses the term "retreating" blade to designate each blade that is moving rearwards relative to the movement in translation of the aircraft. Thus, depending on its azimuth angle, each blade is in an advancing blade position over half a revolution and then in a retreating blade position over the following half revolution.

For convenience and throughout this text, it is assumed that the left of an aircraft lies on the left of a person sitting on a longitudinal anteroposterior plane of symmetry of the aircraft with his or her back towards the rear of the aircraft so as to be looking towards the front of the aircraft. Consequently, it is assumed that the right of the aircraft is situated on the right of said person.

Under such circumstances, when the rotary wing aircraft is moving forwards and the rotor blades are turning clockwise when seen from above, the blades on the left of said person are blades in an advancing position, while the blades on the right of that person are blades in a retreating position. Each blade alternates between the status of a blade in the advancing position and the status of a blade in the retreating position. Naturally, this effect would be inverted if the rotor were turning counterclockwise.

Conventionally, a rotary wing rotor is driven in rotation by a main power transmission gearbox, known under the acronym MGB, the power transmission gearbox itself being driven by a power plant. The power transmission gearbox is fastened to the structure of the aircraft by fastener means, such as sloping fastener bars.

Under such conditions, one of the events to be feared during an accident involving a rotary wing aircraft under non-regulation conditions, is the possibility of at least one of the blades of the rotary wing making contact with the ground.

The blades of the rotary wing run the risk of coming into contact with the ground under accident conditions. This sometimes leads to breakage of the members or of the materials that ensure the blades present stiffness in flapping and in the lead-lag direction.

Consequently, a blade coming into contact with the ground runs the risk of subsequently performing large movements that might lead to interference with the aircraft cabin or with some other structural element of the aircraft, such as its tail boom.

More precisely, it can be understood that the blades in the advancing position run the risk of impacting the cockpit, whereas the blades in the retreating position run the risk of colliding with the tail boom, for example.

Although a collision between a blade and the tail boom will lead a priori to damage that is purely structural, it can be understood that such contact between a blade and the aircraft cabin is nevertheless likely to injure the occupants of the cockpit.

Thus, under emergency landing conditions going beyond the conditions specified by certification regulations, an accident can lead to a blade colliding with the aircraft cabin.

Pilots therefore naturally tend to ensure that the aircraft rolls towards the side where the blades are in the retreating position in order to avoid such a collision.

During a crash taking place at high speed, e.g. at a vertical speed greater than six meters per second, a collision between the blades and the aircraft cabin can be caused by heavy masses being projected forwards, and in particular by the MGB that drives the rotary wing being projected forwards.

In contrast, during a crash that takes place at a slower speed, e.g. a vertical speed lying in the range three to six meters per second, collision of the blades with the aircraft cabin may be caused by breakage of landing gear.

More precisely, the landing gear of an aircraft usually comprises at least two means for making contact with the ground, which means are connected to the fuselage of the aircraft by fastener devices.

In a first embodiment, the landing gear comprises at least two contact means, each having at least one wheel. The wheels of the contact means are connected to the fuselage by fastener elements sometimes referred to as undercarriage "legs".

An undercarriage leg may include an arm that optionally co-operates with a shock absorber or indeed a retraction actuator, for example.

In a second embodiment, the landing gear comprises at least two contact means, each contact means having a respective skid.

Each skid is connected to the fuselage by two fastener devices, e.g. each comprising a fastener zone of the skid, a branch of a cross-member, and a sleeve connecting said branch to said fastener zone. In addition, the branch is connected to the fuselage by means of a fastener member.

By way of example, two-skid landing gear has a front cross-member and a rear cross-member, each cross-member having two branches for connection to the two skids.

Under such circumstances, the landing gear may have four fuselage fastener members, i.e. one fastener member per branch.

In an alternative, the landing gear has three fastener members, two fastener members being fastened to respective ones of the two branches of one of the cross-members, and one fastener member being fastened substantially to the junction between the two branches of the other cross-member.

Under such circumstances, and independently of the nature of the landing gear, each fastener device is dimensioned to present strength in its failure mode that enables it to withstand the emergency landing conditions specified by certification regulations, possibly as increased by a safety margin or safety coefficient. This strength is referred to for convenience as the "regulation strength".

It should also be observed that, for convenience in the present certification, the term "regulation emergency landing conditions" is used to designate the emergency landing conditions as defined by certification regulations and also those conditions as made more severe by the manufacturer for safety reasons, where applicable. Under such circumstances, the emergency landing conditions defined by certification regulations, whether or not made more severe by the manufacturer, are referred to for convenience as "regulation emergency landing conditions".

In contrast, emergency landing conditions not covered by said certification regulations are referred to as "off-specification emergency landing conditions".

Landing gear is then dimensioned to withstand regulation emergency landing conditions. Nevertheless, an aircraft may be confronted with emergency landing conditions that are off specification. Under such off-specification emergency landing conditions, a fastener device of the landing gear may accidentally break, which in turn may lead to a blade of the rotary wing coming into contact with the ground.

It can also be understood that the aircraft may need to land on an inhospitable surface with obstacles of a kind that will lead to off-specification emergency landing conditions, such as obstacles constituted by rocks striking the landing gear during a running landing, for example.

The technological background includes in particular the following documents: FR 2 537 542, JP 2009/073209, FR 2 895 368, FR 1 549 884, certificate of addition FR 2 010 302, and document FR 2 554 210.

Document FR 2 537 542 presents skid landing gear fitted with components including an energy-absorber device that absorbs energy by plastic deformation and/or by force limiting.

Document JP 2009/073209 discloses skid landing gear having an energy-absorber device with elastic members.

Document FR 2 895 368 discloses a rotorcraft having landing gear. The landing gear is connected to the fuselage by connection means that present angular stiffness that varies with the landing gear as shortening a result of making contact with the ground.

Document FR 1 549 884 and certificate of addition FR 2 010 302 disclose energy-absorber devices that absorb energy by plastic deformation and by force limiting, those devices including rolling elements such as balls or wheels arranged between two telescopic members. Thus, in the event of an impact causing the two members to move telescopically, the rolling devices lead to progressive plastic deformation of at least one of the two telescopic members.

Document FR 2 554 210 discloses an energy-absorber device that absorbs energy by elastic deformation of landing gear.

Also known is document EP 0 072 323.

BRIEF SUMMARY OF THE INVENTION

An object of the present invention is thus to propose a method seeking to reduce the risk of an advancing blade striking an aircraft cabin as a result of landing gear breaking under off-specification emergency landing conditions.

The invention thus provides a method of minimizing the consequences of an off-specification emergency landing for the occupants of an aircraft having a rotary wing and a fuselage extending from a front end to a rear end along a longitudinal anteroposterior plane of symmetry in elevation between a first side and a second side of said aircraft, said rotary wing comprising at least one rotor driven in rotation by a main gearbox about an axis of rotation, said rotor being provided with a plurality of blades, each blade being in an advancing position when it is on said first side relative to said longitudinal plane, moving from the rear end towards the front end, and each blade being in a retreating position when it is on said second side relative to said longitudinal plane, moving from the front end towards the rear end, said aircraft having a landing gear with at least one first contact means connected by a first fastener device to the fuselage and at least one second contact means connected by a second fastener device to the fuselage, the first contact means and the first fastener device being arranged on said first side, and the second contact means and the second fastener device being arranged on said second side.

In a first embodiment, the landing gear comprises skid landing gear. Two skid type contact means may be used, the skids possibly being connected together by a front cross-member and a rear cross-member.

The first fastener device may then comprise first fastener elements including: a first branch of each cross-member; a respective first fastener zone for fastening the first skid to each first branch; a respective first sleeve interposed between each first branch and each first fastener zone; and a respective fastener member for fastening each first branch to the fuselage of the aircraft.

Similarly, the second fastener device may then comprise second fastener elements including: a second branch of each cross-member; a respective second fastener zone for fastening the second skid to each second branch; a respective second sleeve interposed between each second branch and each second fastener zone; and a respective fastener member for fastening each second branch to the fuselage of the aircraft.

It should be observed that a single fastener member may be used in common for the first branch and the second branch of a given cross-member.

In a second embodiment, the landing gear may comprise at least three wheeled undercarriages. At least one wheeled undercarriage is arranged on the first side of the aircraft, and at least one wheeled undercarriage is arranged on the second side of the aircraft.

Under such circumstances, the first contact means and the second contact means comprise respectively at least a first wheel and at least a second wheel. The first and second fastener devices then respectively comprise a first fastener element provided in particular with first retraction means and a second fastener element provided in particular with second retraction means.

In the method of the invention, first and second critical fastener elements respectively of the first and second fastener devices are identified, which critical elements are likely to break during a running off-specification emergency landing, such a running off-specification landing taking place under conditions going beyond regulation emergency landing conditions.

Among the fastener elements of each fastener device, a critical fastener element is then determined by testing, calculation, or possibly simulation. It can be understood that the critical fastener element represents a fastener element of the fastener device that is likely to break first during a running off-specification emergency landing.

The first and second critical fastener elements of the contact means are then dimensioned differently so as to favor breakage of one of the critical fastener elements after the other critical fastener element so as to cause the fuselage to topple towards the second side during a running off-specification emergency landing.

It should be recalled that regulation emergency landing conditions correspond, as appropriate, either to the emergency landing conditions as imposed by said regulations, or to said emergency landing conditions as imposed by said regulations and as made more severe by the manufacturer.

Consequently, the strengths of the fastener devices and in particular of the identified critical fastener elements are not symmetrical about the longitudinal plane. It can be understood that this characteristic maximizes the probability of the fuselage being made to topple towards the second side of the aircraft, the side where the blades are in the retreating position.

The landing gear and in particular the fastener elements of the contact means are dimensioned to comply with certification regulations. Nevertheless, one of the critical fastener elements is overdimensioned compared with the other critical fastener element. This overdimensioning may also present the advantage of limiting its impact in terms of aircraft weight, of enabling overdimensioned landing gear to be interchanged with conventional landing gear, and of not affecting the absorption qualities of the landing gear or the behavior of the landing gear when faced with the ground resonance phenomenon.

It can thus be seen that it is possible to modify existing landing gear using this method, while limiting the impacts of the modification.

Thus, if the aircraft performs a running landing under conditions going beyond the regulation emergency landing conditions, the manufacturer cannot guarantee that the landing gear will not be damaged as a result of the landing. In contrast, the invention seeks to minimize the consequences of such an off-specification landing by favoring the breakage of a clearly identified fastener element.

If such a fastener element is to break, the invention tends to cause a predetermined fastener element to break so that the fuselage of the aircraft topples towards the second side. Consequently, the risk of an advancing blade impacting the cabin of the aircraft is minimized.

The invention is thus particularly useful during a running landing that might lead to the landing gear striking against an obstacle.

The method may also include one or more of the following characteristics.

For example, the strength in its failure mode of the first critical fastener element is greater than the strength in its failure mode of the second critical fastener element.

In another aspect, the strength in its failure mode of a critical fastener element that is to break first may be determined to withstand the forces to which it is subjected during the regulation running emergency landing conditions, the strength in its failure mode of the other critical fastener element that is to break second being greater than the strength in its failure mode of the critical fastener element that is to break first.

Consequently, among the fastener elements, the critical first and second fastener elements are identified together with their failure modes.

The critical fastener element that is to break first is then dimensioned in conventional manner, while in contrast the strength of the critical fastener elements that are to break second is increased compared with the strength that would theoretically suffice to withstand the forces to which they are subjected during regulation emergency landing conditions.

It is possible in particular to act on the thickness of the fastener elements concerned, on their material, or indeed on the treatments applied to those connection elements in order to adjust their strength.

Under such circumstances, the strength of the landing gear is not degraded compared with conventional landing gear under regulation emergency landing conditions.

Nevertheless, it is appropriate to verify that the impact of the landing gear as dimensioned in this way has no significant impact on the ground resonance phenomenon.

As a function of the arrangement of the critical fastener elements, one and or another of the critical fastener elements is/are overdimensioned for example in traction and in compression, in bending, or indeed in shear, in order to obtain the looked-for result.

The impact of the modification on normal operation of the landing gear is then minimized. The modification to the landing gear thus does not involve repeating certification tests in full.

For example, each fastener device has both energy-absorber fastener elements that are stressed to absorb the energy that results from a vertical landing, and also non-energy-absorber fastener elements, and the critical fastener element is a non-energy-absorber fastener element.

The impact of the modification on the operation of landing gear during purely vertical landing is then minimized.

Under such circumstances, in a first variant of the first embodiment, the first and second contact means comprise respective first and second skids, the first and second critical fastener elements comprise respectively at least one first fastener zone for fastening the first skid to a cross-member and at least one second fastener zone for fastening the second skid to a cross-member, the strength in its failure mode of each first fastener zone being determined to be greater than the strength in its failure mode of at least one of the second fastener zones that is to break first.

For example, the first skid and the second skid are connected together by a front cross-member and a rear cross-member. The first skid then has a front first fastener zone fastened to the front cross-member and a rear first fastener zone fastened to the rear cross-member. Similarly, the second skid has a front second fastener zone fastened to the front cross-member and a second rear fastener zone fastened to the rear cross-member.

The front and rear first fastener zones are then dimensioned so that their strength is greater than the strength of at least one second fastener zone so as to favor toppling of the fuselage towards the second side, where appropriate.

By way of example, it is possible to reinforce the first fastener zones by increasing the thickness of their material, possibly by lining them internally. Naturally, any other known method may be used, and in particular heat treatment methods.

In a second variant, the first and second contact means comprise respective first and second skids, the first and second fastener devices comprise respectively at least one first fastener zone for fastening the first skid to a cross-member and at least one second fastener zone for fastening the second skid to a cross-member, the first and second critical fastener elements respectively comprising at least one first sleeve for connecting a first fastener zone to a cross-member, and at least one second sleeve for connecting a second fastener zone to a cross-member, the strength in its failure mode of each first sleeve being determined to be greater than the strength in its failure mode of at least one second sleeve.

For example, it is possible to increase the thickness of the first sleeves compared with the thickness of at least one second sleeve in order to increase the bending strength of the first sleeve relative to the bending strength of at least one second sleeve.

The first and second variants present in particular the advantage of having limited impact on the ground resonance phenomenon.

It should be observed in particular that the critical fastener elements of the fastener devices are stressed particularly strongly during a running landing.

More particularly, the connections between the cross-members and the skids are stressed by the forces that result from friction between the skids and the ground. In the overall equilibrium of the landing gear, it is possible for example to observe a bending moment that is applied to said connections, which bending moment may sometimes be zero or very small during a landing that takes place under regulation landing conditions. The failure mode under consideration may then be a mode of failure in bending.

By overdimensioning the first connections placed on the first side of the aircraft compared with at least one second connection placed on the second side, the possibility of a connection present on the second side breaking first is maximized so as to favor the aircraft toppling towards said second side in the event of a crash.

It should be recalled that under normal situations, the landing gear is dimensioned to withstand the various forces it encounters. However, if the aircraft is confronted with a crash taking place in abnormal situations, the invention then tends to minimize the risks to which its occupants are exposed.

The connection that breaks with preference may be a fastener zone of a skid in the first variant, or a sleeve in the second variant.

It can be understood that it is optionally possible to combine said variants. Depending on the failure mode of the critical fastener elements, it is possible to apply a preferred variant.

For example, if the landing gear tends to break in a mode of failure in bending, the second variant appears to be advantageous.

In a second embodiment, the landing gear may have at least three wheeled undercarriages. At least one wheeled undercarriage is arranged on the first side of the aircraft and at least one wheeled undercarriage is arranged on the second side of the aircraft.

Under such circumstances, the first contact means and the second contact means comprise respectively at least a first wheel and at least a second wheel, the first and second critical fastener elements comprising respectively first retraction means and second retraction means, the strength in its failure mode of the first retraction means being determined to be greater than the strength in its failure mode of the second retraction means.

In addition to a method, the invention provides a rotary wing aircraft implementing the method.

Such a rotary wing aircraft has a fuselage extending from a front end to a rear end along a longitudinal anteroposterior plane of symmetry in elevation between a first side and a second side of said aircraft, said rotary wing comprising at least one rotor driven in rotation by a main gearbox about an axis of rotation, said rotor being provided with a plurality of blades, each blade being in an advancing position when it is on said first side relative to said longitudinal plane, moving from the rear end towards the front end, and each blade being in a retreating position when it is on said second side relative to said longitudinal plane, moving from the front end towards the rear end, said aircraft having landing gear with at least one first contact means connected by a first fastener device to the fuselage and at least one second contact means connected by a second fastener device to the fuselage, the first contact means and the first fastener device being arranged on said first side, and the second contact means and the second fastener device being arranged on said second side.

Under such circumstances, the first and second fastener devices have respective first and second critical fastener elements likely to break during a running off-specification emergency landing taking place under conditions going beyond regulation emergency landing conditions, the strength of one of the critical fastener element in its failure mode differing from the strength of the other critical fastener element in its failure mode to favor toppling of the fuselage towards the second side during an off-specification landing taking place under conditions going beyond regulation emergency conditions defined by certification regulations.

In a first variant of a first embodiment, the first and second contact means comprise respectively first and second skids, and the first and second critical fastener elements comprise respectively at least one first fastener zone for fastening said first skid to a cross-member and at least one second fastener zone for fastening said second skid to a cross-member.

In a second variant of a first embodiment, the first and second contact means comprise respective first and second skids, and the first and second critical fastener elements comprise respectively at least one first sleeve for connecting a first fastener zone to a cross-member, and at least one second sleeve for connecting a second fastener zone to a cross-member.

In a second embodiment, the first and second contact means comprise respectively at least a first wheel and at least a second wheel, and the first and second critical fastener elements comprise respectively first retraction means and second retraction means.

BRIEF DESCRIPTION OF THE SEVERAL VIEWS OF THE DRAWINGS

The invention and its advantages appear in greater detail from the following description of embodiments given by way of illustration with reference to the accompanying figures, in which.

Elements shown in more than one of the figures are given the same references in each of them.

DETAILED DESCRIPTION OF THE INVENTION

Figure 1:
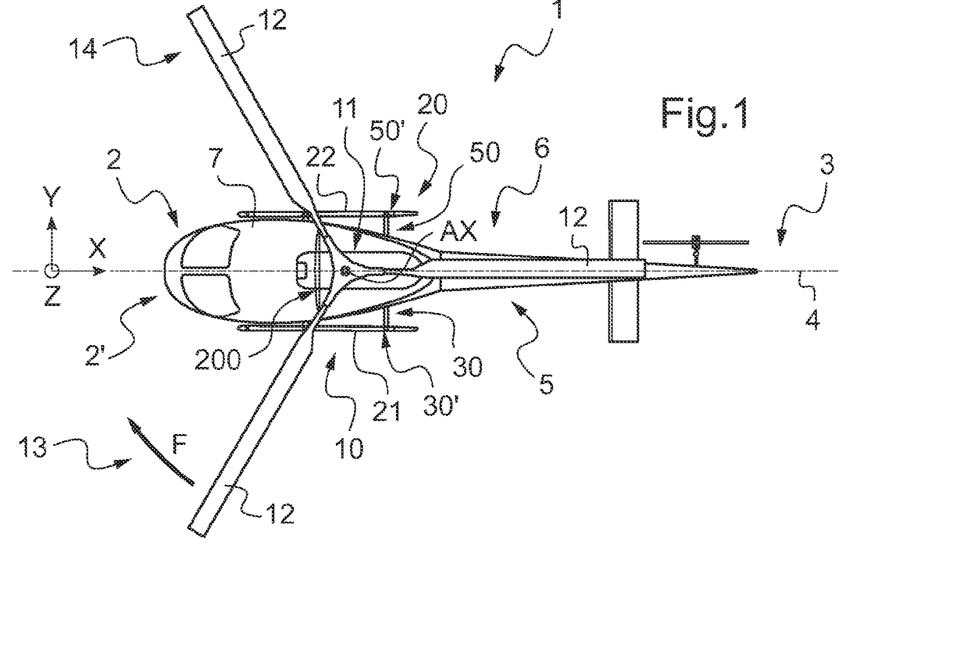
FIG. 1 is a plan view of an aircraft fitted with skid landing gear.
Figure 2:
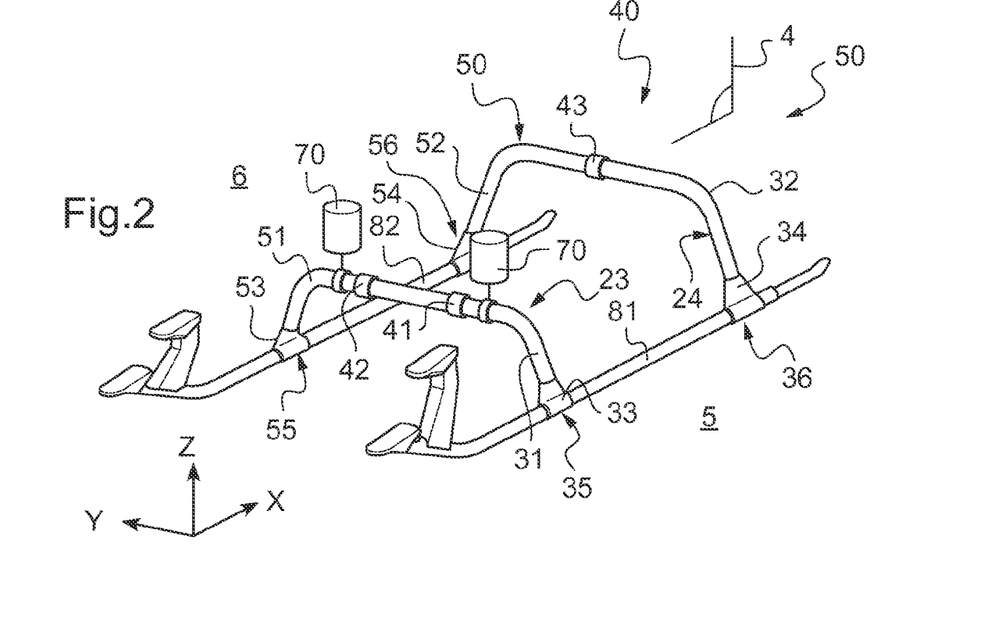
FIG. 2 is a perspective view of skid landing gear.
Figure 4:
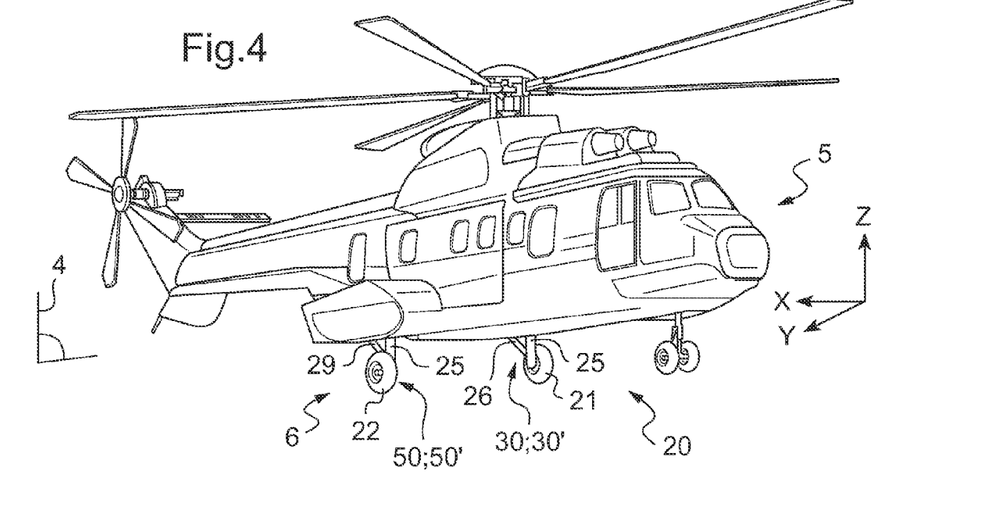
FIG. 4 is a view of an aircraft having wheeled landing gear.

It should be observed that three mutually orthogonal directions X, Y, and Z are shown in FIGS. 1, 2, and 4.

The direction X is said to be longitudinal. The term "length" relates to a longitudinal dimension of the aircraft extending in this longitudinal direction X.

Another direction Y is said to be transverse. The term "width" relates to a transverse dimension of the aircraft in this transverse direction.

Finally, a third direction Z is said to be in elevation and corresponds to the height dimensions of the structures described. The term "height" then relates to a dimension in elevation of the aircraft in this elevation direction.

FIG. 1 shows an aircraft 1 of the invention comprising a fuselage 7 extending from a front end 2 towards a rear end 3 in the longitudinal direction X along a longitudinal plane 4 of anteroposterior symmetry in elevation, referred to for convenience herein as the "longitudinal plane".

The reference 1 extends more precisely from a nose 2' towards a tail boom, the longitudinal plane 4 separating a first side 5 of the aircraft 1 from a second side 6 of the aircraft.

Furthermore, the aircraft 1 has a rotary wing 10 provided with at least one rotor 11 having a plurality of blades 12, the aircraft 1 being a helicopter, for example. The rotor 11 is driven in rotation by a power plant acting via a main power transmission gearbox (MGB) 200 arranged in the fuselage of the aircraft 1.

Under drive from the power plant acting via the MGB, each blade 12 rotates about the axis of rotation AX of the rotor, alternating between a substantially semicircular portion in which the blade is an advancing position 13 and a substantially semicircular portion in which the blade is in a retreating position 14. More precisely, when the blade is on the first side 5 of the aircraft 1, the blade is in an advancing position 13, whereas a blade located on the second side 6 of the aircraft 1 is a blade in a retreating position 14.

By way of example, when the rotor 11 turns clockwise when seen from above along arrow F, as shown in FIG. 1, the first side is on the left of the longitudinal plane 4 as seen from above, while the second side is situated on the right of the longitudinal plane 4 as seen from above. Conversely, if the rotor 11 rotates in the counterclockwise direction as seen from above, then the first side is on the right of the longitudinal plane 4 as seen from above while the second side is situated on the left of the longitudinal plane 4 as seen from above.

Furthermore, the aircraft includes landing gear 20 provided with at least first contact means 21 situated on the first side 5 of the aircraft and second contact means 22 situated on the second side 6 of the aircraft.

In the first embodiment of FIG. 1, the landing gear 20 is a skid landing gear, each contact means consequently being a skid that extends longitudinally.

Independently of the invention, each contact means 21, 22 is connected to the fuselage by a fastener device.

Under such circumstances, the first contact means 21 is connected to the fuselage 7 by a first fastener device 30, while the second contact means 22 is connected to the fuselage 7 by a second fastener device 50.

In accordance with the method of the invention, in order to minimize any risk of a blade in an advancing position impacting against a contact surface during an off-specification landing giving rise to accelerations that are deemed to be positive either when forwards in the direction going from the rear end towards the front end of the aircraft or when downwards in the direction going from the rotary wing towards the ground, or in particular giving rise to accelerations that are both forwards and downwards, then testing, calculation, or simulation is used to identify a first fastener element 30' and a second fastener element 50' respectively for the first and second fastener devices that are likely to break in the event of a running off-specification emergency landing. These first and second fastener elements are then said to be "critical" to distinguish them from other fastener elements.

The critical first and second fastener elements 30' and 50' are then dimensioned differently compared with the first and second fastener devices 30, 50, respectively. Thus, first and second critical fastener elements 30', 50', possibly arranged symmetrically on either side of the longitudinal plane 4, present different strengths.

More precisely, the first and second critical fastener elements 30' and 50' are dimensioned differently so as to ensure that one of the critical fastener elements breaks after the other critical fastener element so as to cause the fuselage to topple towards the second side during an off-specification landing that takes place under conditions going beyond the regulation emergency landing conditions imposed by certification regulations. It should be recalled that regulation emergency landing conditions include emergency landing conditions imposed as such by certification regulations and also emergency landing conditions imposed as such by certification regulations made more severe by the manufacturer for safety reasons.

Consequently, if the aircraft is to topple to one side, the trend is to encourage the fuselage 7 to topple towards the second side 6 at the moment of an impact in order to avoid interference between a blade in the advancing position and a contact surface, where that would potentially be dangerous.

In order to guarantee good operation under normal conditions, i.e. regulation emergency landing conditions, it is possible initially to dimension all of the fastener elements so that they withstand the forces induced by regulation emergency landing conditions. Thereafter, strength is increased in the failure element of the critical fastener element that is to break second during an off-specification landing. Consequently, the critical fastener element that is to break second is overdimensioned.

More precisely, the strength in the failure mode of the first critical fastener element 30' is determined so as to be greater than the strength in the failure mode of the second critical fastener element 50'. The fastener elements are thus dimensioned so as to obtain the determined strengths.

FIG. 2 shows a first embodiment of the invention.

The landing gear is a skid landing gear.

The landing gear has a first skid 81 and a second skid 82 representing respective first and second contact means 21 and 22 of the aircraft.

The skids are connected together by a front cross-member and by a rear cross-member 24. Each cross-member has one downwardly-extending branch 31, 32, 51, 52 per skid, with each fastener branch being connected to a fastener zone 35, 36, 55, 56 of a skid by a sleeve 33, 34, 53, 54.

Furthermore, the landing gear has at least three fastener members 40 for fastening to the fuselage 7, comprising two fastener members 41 and 42 arranged on respective ones of the two branches of one of the cross-members on either side of the longitudinal plane 4, and a central fastener member 43 arranged on the other cross-member on the longitudinal plane 4, astride both branches of this other cross-member.

In another variant, each cross-member may co-operate with two respective fastener members.

Figures 3, 5:
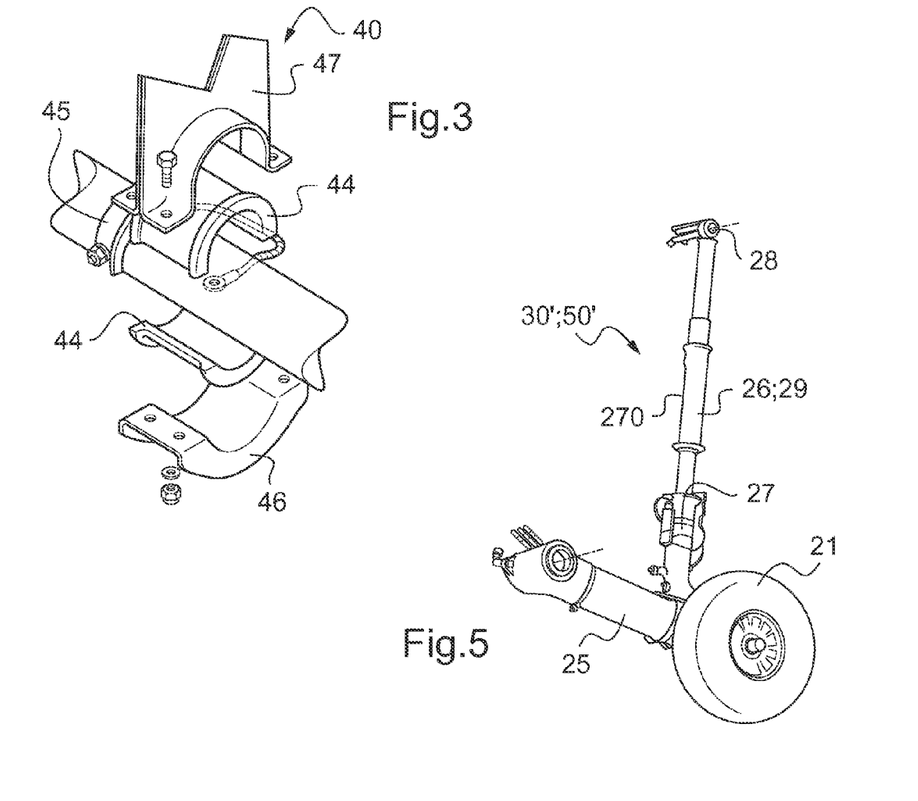
FIG. 3 is a view of a fastener member.
FIG. 5 is a view of a main undercarriage of wheeled landing gear.

FIG. 3 shows a fastener member 40. The fastener member may include a lining 44 surrounding a cross-member tube. This lining co-operates with a half-collar 46 and with a structure 47 of the fuselage 7 that is suitable for being secured to the half-collar 46. Furthermore, the fastener member 40 includes at least one stop means 45.

With reference to FIG. 2, the landing gear may include damper means 70.

In a first variant of the first embodiment, the first and second critical fastener elements 30' and 50' include respectively at least the first fastener zones 35, 36 for fastening the first skid to the cross-members, and at least one second fastener zone 55, 56 for fastening the second skid to a cross-member.

Thus, the strength in the failure mode of each first fastener zone 35, 36 is determined to be greater than the strength in the failure mode of at least one second fastener zone 55, 56 that is to break first.

In a second variant of the first embodiment, the first and second critical fastener elements 30' and 50' comprise respectively the first sleeve 33, 34 situated on the first side and at least one of the second sleeves 53, 54 situated on the second side.

The strength in the failure mode of each first sleeve is determined to be greater than the strength in the failure mode of at least one second sleeve.

FIG. 4 shows a second embodiment of the invention.

The landing gear 20 is wheeled landing gear having one nose undercarriage and two main undercarriages situated on either side of the longitudinal plane 4.

One main undercarriage is then situated on the first side of the aircraft, while the other main undercarriage is situated on the second side of the aircraft.

The first main undercarriage situated on the first side comprises a rocker beam 25 carrying at least one wheel 21 and first retraction means 26. Similarly, the second main undercarriage situated on the second side comprises a rocker beam 25 carrying at least one wheel 22 and second retraction means 29.

For example, the first and second critical fastener elements 30', 50' comprise respectively the first retraction means 26 and the second retraction means 29.

Under such circumstances, the strength in the failure mode of the first retraction means 26 is determined to be greater than the strength in the failure mode of the second retraction means 29.

With reference to FIG. 5, each retraction means may comprise a retraction actuator 27, a shock absorber 270, and a hinge 28 connected to the fuselage.

It is then possible to overdimension the first hinge with the fuselage of the first retraction means 26 relative to the second hinge with the fuselage of the second retraction means 29.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A method of minimizing the consequences of an off-specification emergency landing for the occupants of an aircraft having a rotary wing and a fuselage extending from a front end to a rear end along a longitudinal anteroposterior plane of symmetry in elevation between a first side and a second side of the aircraft, the rotary wing comprising at least one rotor driven in rotation by a main gearbox about an axis of rotation (AX), the rotor being provided with a plurality of blades, each blade being in an advancing position when on the first side relative to the longitudinal plane, moving from the rear end towards the front end, and each blade being in a retreating position when it is on the second side relative to the longitudinal plane, moving from the front end towards the rear end, the aircraft having a landing gear with at least one first contact means connected by a first fastener device to the fuselage and at least one second contact means connected by a second fastener device to the fuselage, the first contact means and the first fastener device being arranged on the first side, and the second contact means and the second fastener device being arranged on the second side, the method comprising:

identifying first and second critical fastener elements for breakage during a running off-specification emergency landing taking place under conditions going beyond regulation emergency landing conditions, the first and second critical fastener elements being associated with the first and second fastener devices, respectively, the first and second critical fastener elements being spaced from the longitudinal plane of symmetry, wherein the first critical fastener element has a same corresponding location relative to the longitudinal plane of symmetry as the second critical fastener element; and dimensioning the first and second critical fastener elements differently so as to favor breakage of the first critical fastener element after the second critical fastener element so as to cause the fuselage to topple towards the second side during a running off-specification emergency landing; and providing the first and second critical fastener elements to the respective first and second fastener devices.

2. A method according to claim 1, wherein the strength in failure mode of the first critical fastener element is greater than the strength in failure mode of the second critical fastener element.

3. A method according to claim 1, wherein each fastener device has both energy-absorber fastener elements that are stressed to absorb the energy that results from a vertical landing, and wherein each fastener device also has non-energy-absorber fastener elements, the corresponding critical fastener element being a non-energy-absorber fastener element.

4. A method according to claim 1, wherein the strength in failure mode of the second critical fastener element is determined to withstand the subjected forces during the regulation emergency landing conditions, the strength in failure mode of the other first critical fastener element being greater than the strength in failure mode of the second critical fastener element.

5. A method according to claim 1, wherein the first and second contact means comprise respective first and second skids, the first and second critical fastener elements comprise respectively at least one first fastener zone for fastening the first skid to a cross-member and at least one second fastener zone for fastening the second skid to a cross-member, the strength in failure mode of each first fastener zone being determined to be greater than the strength in failure mode of at least one of the second fastener zones that is to break first.

6. A method according to claim 1, wherein the first and second contact means comprise respective first and second skids, the first and second fastener devices comprise respectively at least one first fastener zone for fastening the first skid to a cross-member and at least one second fastener zone for fastening the second skid to a cross-member, the first and second critical fastener elements respectively comprising at least one first sleeve for connecting a first fastener zone to a cross-member, and at least one second sleeve for connecting a second fastener zone to a cross-member, the strength in failure mode of each first sleeve being determined to be greater than the strength in failure mode of at least one second sleeve.

7. A method according to claim 1, wherein the first and second contact means comprise respectively at least a first wheel and at least a second wheel, the first and second critical fastener elements comprising respectively first retraction means and second retraction means, the strength in failure mode of the first retraction means being determined to be greater than the strength in failure mode of the second retraction means.

8. A method of minimizing the consequences of an off-specification emergency landing for occupants of a rotorcraft, the method comprising:

providing a rotorcraft having a fuselage extending from a nose to a tail along a plane of symmetry between a first side and a second side, the rotorcraft having a rotor with a plurality of rotor blades, each of the rotor blades being in an advancing position when on the first side of the plane of symmetry and in a retreating position when on the second side of the plane of symmetry, the rotorcraft having a landing gear with a first fastener device connected to the fuselage on the first side of the plane of symmetry and a second fastener device connected to the fuselage on the second side of the plane of symmetry, the first fastener device including a first plurality of fastener elements on the first side of the plane of symmetry and the second fastener device including a second plurality of fastener elements on the second side of the plane of symmetry, each respective fastener element of the first plurality of fastener elements having a corresponding fastener element in the second plurality of structural fastener elements;

identifying a first critical fastener element of the first plurality of fastener elements and a second critical fastener element of the second plurality of fastener elements for breakage during an off-specification emergency landing, the first critical fastener element being spaced from the plane of symmetry on the first side of the plane of symmetry and the second critical fastener element being spaced from the plane of symmetry on the second side of the plane of symmetry, the first critical fastener element having a same corresponding location relative to the longitudinal plane of symmetry as the second critical fastener element, and dimensioning the first critical fastener element differently from the second critical fastener element to promote breakage of the second critical fastener element prior to the first critical fastener element so as to cause the fuselage to topple towards the second side during an off-specification emergency landing; and providing the first and second critical fastener elements to the respective first and second fastener devices.

9. The method of claim 8, wherein second side during an off-specification emergency landing results in a rotor blade contacting an emergency landing surface on the second side of the plane of symmetry.

10. The method of claim 8, wherein the first critical element has a same purpose as the second critical element, and generally a same shape and size as the second critical element.

11. The method of claim 8, wherein dimensioning the first critical fastener element differently from the second critical fastener element includes providing a component of the first critical fastener element with a strength in failure mode that is greater than a strength in failure mode of a corresponding component of the second critical fastener element.

12. The method of claim 8, wherein the first and second fastener devices each have both energy-absorber fastener elements that are stressed to absorb the energy that results from a vertical landing, and wherein the first and second fastener devices also each have non-energy-absorber fastener elements, the first and second critical fastener elements being non-energy-absorber structural elements.

13. The method of claim 8, wherein dimensioning the first critical fastener element differently from the second critical fastener element includes dimensioning both the first and second critical fastener elements to withstand forces caused by the regulation emergency landing conditions, and providing the first critical fastener element with a strength in failure mode that is greater than a strength in failure mode of second critical fastener element.

14. The method of claim 8, wherein the landing gear comprises a cross-member, a first skid on the first side of the plane of symmetry, and a second skid on the second side of the plane of symmetry, the first critical fastener element includes a first fastener fastening the first skid to the cross-member, the second critical fastener element includes a second fastener fastening the second skid to the cross member, and wherein dimensioning the first critical fastener element differently from the second critical fastener element includes providing the first fastener with a strength in failure mode that is greater than a strength in failure mode of the second fastener.

15. The method of claim 8, wherein the landing gear comprises a cross-member, a first skid on the first side of the plane of symmetry, and a second skid on the second side of the plane of symmetry, the first critical fastener element includes a first sleeve connecting the first skid to the cross-member, and the second critical fastener element includes a second sleeve connecting the second skid to the cross member, and wherein dimensioning the first critical fastener element differently from the second critical fastener element includes providing the first sleeve with a strength in failure mode that is greater than a strength in failure mode of the second sleeve.

16. The method of claim 8, wherein the landing gear comprises a first wheel connected to the fuselage on the first side of the plane of symmetry by the first portion and a second wheel connected to the fuselage on the second side of the plane of symmetry by the second portion, the first critical element includes a first retractable connection and the second critical element includes a second retractable connection, and wherein dimensioning the first critical fastener element differently from the second critical fastener element includes providing the first retractable connection with a strength in failure mode that is greater than a strength in failure mode of the second retractable connection.

* * * * *